United States Patent [19]

Birr et al.

[11] 4,289,416

[45] Sep. 15, 1981

[54] ARRANGEMENT FOR MOUNTING AND DISMOUNTING PIVOTED LEVERS IN TOOL HOUSINGS

[75] Inventors: Hans J. Birr, Wuppertal; Paul-Ulrich Uibel, Ennepetal, both of Fed. Rep. of Germany

[73] Assignee: Vorwerk & Co. Interholding GmbH, Wuppertal, Fed. Rep. of Germany

[21] Appl. No.: 126,829

[22] Filed: Mar. 3, 1980

[30] Foreign Application Priority Data

Mar. 10, 1979 [DE] Fed. Rep. of Germany ... 7906701[U]

[51] Int. Cl.³ .............................................. F16C 11/06
[52] U.S. Cl. .................................. 403/146; 403/163; 403/166
[58] Field of Search ............... 403/161, 166, 153, 152, 403/146, 154, 163; 64/5

[56] References Cited

U.S. PATENT DOCUMENTS

| | | | |
|---|---|---|---|
| 1,634,272 | 7/1927 | Shook | 64/5 |
| 1,726,720 | 9/1929 | Schroyer | 64/5 |
| 1,739,203 | 12/1929 | Axe | 64/5 |
| 2,106,073 | 1/1938 | Stuber | 64/5 |
| 2,901,237 | 8/1959 | Gruer | 403/166 X |

*Primary Examiner*—Andrew V. Kundrat
*Attorney, Agent, or Firm*—Michael J. Striker

[57] ABSTRACT

An arrangement for mounting and dismounting pivoted levers in tool housings in which the lever has a projection engaging a first groove in the tool housing and a blind bore extending transversely through the lever and coaxially within the projection, wherein an axle journal is inserted in the blind bore to project in a second groove within the tool housing. When mounting or dismounting the arrangement, an implement is introduced in a slit above the axle journal, to disengage the axle journal from the groove, thereby releasing the support of the lever.

3 Claims, 1 Drawing Figure

ARRANGEMENT FOR MOUNTING AND DISMOUNTING PIVOTED LEVERS IN TOOL HOUSINGS

BACKGROUND OF THE INVENTION

The present invention relates to an arrangement for mounting and dismounting pivoted levers in tool housings.

There have been proposed many different arrangements for supporting pivoted levers in tool housings. These arrangements, however, have a considerable disadvantage since the lever supported in the known manner, can be dismounted or replaced and mounted only by disassembling the clamping of the bearing. Thus, bearing clamps must be disengaged or clampings must be unlocked in order to disengage the support.

SUMMARY OF THE INVENTION

Accordingly, it is an object of the present invention to provide an arrangement which overcomes the difficulties of the prior art.

A more particular object of the invention is to provide an arrangement which essentially facilitates the mounting and dismounting of pivoted levers in tool housings.

A further object of the invention is to provide an arrangement which is of an inexpensive construction.

Pursuant to the above objects, and to others which will become apparent hereafter, a feature of the invention resides in an arrangement which, briefly stated, comprises a lever including integrally therewith a projection transversely extending therefrom and engaging a first groove within a tool housing wherein an elongated blind bore transversely extends through the lever and coaxially provided with the projection which elongated blind bore receives in its open end an axle journal which is projecting therefrom in to a second groove within the tool housing, wherein the axle journal is movable from a first position engaging the second groove to a second position in which it is disengaged from the second groove, a spring provided within the blind bore whose one end is being supported by the closed end of the blind bore while the other end is abutting on the axle journal for pressing the axle journal into the second groove and supporting the lever, and a sheet metal holder which is arranged on the tool housing above the second groove for preventing upward movement of the axle journal in the mounted position.

According to yet another feature of this invention, the lever is further provided with a slit above the axle journal to permit an engagement of an implement thereby achieving the movement of the axle journal from the first position into the second position.

Through the provision of an arrangement according to the invention, a pivoted lever can be easily mounted or dismounted in a tool housing without unscrewing or disengaging other parts of the arrangement.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE shows an enlarged partial side view, partly in section, of an arrangement according to the invention showing the support of a lever in detail.

DESCRIPTION OF THE PREFERRED EMBODIMENTS

Figure 1:
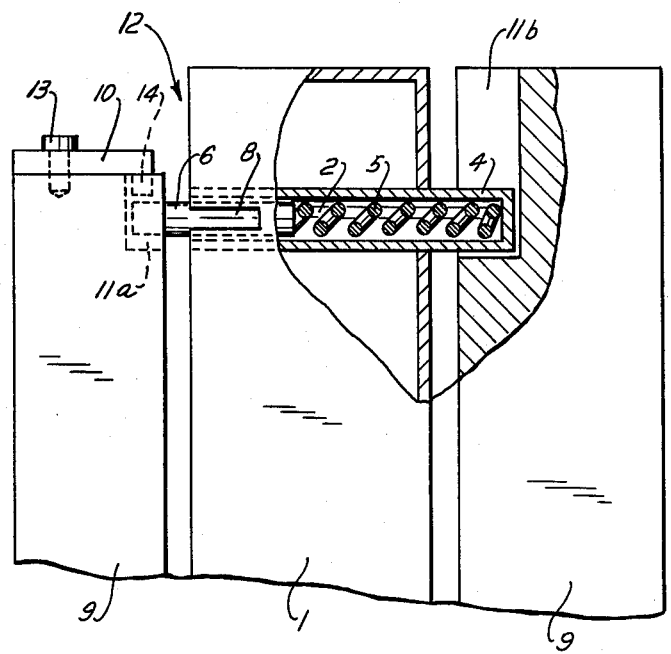

Referring to the FIGURE, there can be seen a section of a tool housing 9 having a recess 12 in which a rotating lever 1 can be inserted. The lever 1 has integral therewith a projection 4 which transversely extends therefrom. Coaxially with the projection 4 and transversely extending through the lever 1, there is provided an elongated blind bore 2 in whose open end an axle journal 6 is inserted in order to achieve a to-and-fro movement of the axle journal 6 in longitudinal direction. A spring 5 is also provided within the blind bore 2 and one end of the spring is abutting on the axle journal 6 and the other end is supported by the projection 4.

As can be seen from the FIGURE, there are arranged two grooves 11a, 11b in the tool housing 9. The first groove 11b has an elongated shape in axial parallel direction to the tool housing 9 in which groove the projection 4 is protruding when mounting the assembly. The second groove 11a is diametrically opposite to the axle journal 6 and has also an elongated shape in axial parallel direction to the tool housing. In the groove 11a, the axle journal is protruding when the lever 1 is mounted into the recess 12 of the tool housing 9. To secure the support of the lever within the tool housing 9 and, thus, to prevent an upward movement of the lever along the elongated grooves 11a, 11b, a sheet metal holder 10 is fastened on the tool housing above the second groove 11a by a screw 13. As it is illustrated in the FIGURE in dotted lines, the sheet metal holder 10 has a projection 14 on its one end which is facing the lever, wherein the projection 14 is protruding into the groove 11a to retain the axle journal 6 therein.

When mounting the lever 1 into the tool housing 9, a pointed implement (not shown) is to be inserted into a slit 8 formed in the lever 1 and coaxially arranged with the blind bore 2. By inserting the implement into the slit 8, the axle journal 6 can be moved in axial direction into the blind bore counter to the spring force. Then the lever 1 can be inserted into the tool housing 9 by sliding the projection 4 along the groove 11b. The implement is then removed thereby achieving a release of the spring so that the axle journal 6 is pressed and thus projected into the groove 11a. The lever 1 is now supported in the tool housing 9 in a pivoted manner. In the case of dismounting the arrangement, one proceeds in inverted manner, i.e. the pointed implement is to be inserted through the slit 8 thereby moving the axle journal 6 out of the groove 11 and removing the lever 1 in upward direction along the groove 11b. For facilitating the mounting or dismounting, a running depression (not shown) can be arranged on the movable axle journal 6. Moreover, it is to be noted, that the enlargement of the arrangement shown in the FIGURE is not in the correct scale.

It will be understood that each of the elements described above, or two or more together, may also find a useful application in other types of arrangements for levers in tool housing differing rrom the type described above.

While the invention has been illustrated and described as embodied in an arrangement for mounting and dismounting rotating lever assemblies in tool housings, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for mounting and dismounting pivoted lever assemblies in tool housings, comprising a lever having two opposite lateral sides and including a projection integrally formed therewith and extending transversely therefrom, a tool housing having a recess to receive said lever and formed with two oppositely positioned elongated grooves each facing the respective opposite side of said lever, said projection being formed with an elongated blind bore having a closed end formed by said projection and extending into one of said grooves and an open end diametrically opposite to said closed end; an axle journal inserted into said open end and projecting therefrom into a second of said elongated grooves, said axle journal being adapted to move within said blind bore between a first position engaging said second groove and a second position being disengaged from said second groove; a spring mounted within said blind bore and having one end supported in said closed end of said blind bore and another end abutting said axle journal; and a sheet metal holder secured to the tool housing above said second groove for preventing an upward movement of said axle journal in said first position.

2. The arrangement of claim 1, wherein said lever further includes an elongated slit arranged coaxially with said blind bore, said slit being adapted to permit an implement to be inserted from the outside of said lever to move said axle journal from said first position into said second position and vice versa.

3. The arrangement of claim 2, wherein said sheet metal holder includes a projection extending into said second groove for retaining said axle journal in said second groove.

* * * * *